United States Patent
Kyselov

(10) Patent No.: US 11,520,049 B2
(45) Date of Patent: Dec. 6, 2022

(54) PULSED-LIGHT DETECTION AND RANGING APPARATUS, SYSTEM AND METHOD OF DETECTION AND RANGING OF AN OBJECT IN A PULSED LIGHT DETECTION AND RANGING SYSTEM

(71) Applicant: Melexis Technologies NV, Tessenderlo (BE)

(72) Inventor: Andrii Kyselov, Kyiv (UA)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 832 days.

(21) Appl. No.: 16/373,908

(22) Filed: Apr. 3, 2019

(65) Prior Publication Data

US 2019/0310371 A1 Oct. 10, 2019

(30) Foreign Application Priority Data

Apr. 4, 2018 (EP) .................................... 18165668

(51) Int. Cl.
*G01S 17/00* (2020.01)
*G01S 17/26* (2020.01)
*G01S 17/42* (2006.01)
*G01S 7/4865* (2020.01)
*G01S 17/10* (2020.01)

(52) U.S. Cl.
CPC ............ *G01S 17/26* (2020.01); *G01S 7/4865* (2013.01); *G01S 17/10* (2013.01); *G01S 17/42* (2013.01)

(58) Field of Classification Search
USPC ....................................................... 356/5.01
See application file for complete search history.

(56) References Cited

U.S. PATENT DOCUMENTS

| 4,135,161 A | 1/1979 | Torrieri |
| 8,831,908 B2 * | 9/2014 | Kamitani ............... G01S 7/4865 702/159 |
| 10,292,604 B2 * | 5/2019 | Nishibayashi ..... A61B 5/02116 |
| 2011/0246116 A1 | 10/2011 | Kamitani et al. |
| 2015/0025399 A1 * | 1/2015 | Nishibayashi ..... A61B 5/02141 600/492 |

FOREIGN PATENT DOCUMENTS

| DE | 102009049069 A1 * | 4/2011 | ............. G01F 1/667 |
| EP | 2372389 A1 | 10/2011 | |
| EP | 2823758 A1 * | 1/2015 | ......... A61B 5/02116 |

OTHER PUBLICATIONS

European Search Report and Search Opinion for EP18165668 (dated Year: 2018).*

* cited by examiner

*Primary Examiner* — James R Hulka

(74) *Attorney, Agent, or Firm* — Harness, Dickey & Pierce, P.L.C.

(57) ABSTRACT

A pulsed-light detection and ranging apparatus comprises an optical detector arranged to generate, when in use, time-series data in response to an optical pulse incident thereupon. A processing resource is also provided and arranged to support a pulse analyser (132). The pulse analyser (132) is arranged to identify (134) an inflection point of a pulse described by the time-series data. The pulse analyser (132) is further arranged to calculate (138) a distance based upon determined inflection point relative to a time axis associated with the time-series data.

15 Claims, 4 Drawing Sheets

PULSED-LIGHT DETECTION AND RANGING APPARATUS, SYSTEM AND METHOD OF DETECTION AND RANGING OF AN OBJECT IN A PULSED LIGHT DETECTION AND RANGING SYSTEM

The present invention relates to a pulsed-light detection and ranging apparatus of the type that, for example, calculates a distance to an object. The present invention also relates to a pulsed-light detection and ranging system of the type that, for example, calculates a distance to an object. The present invention also relates to a method of detection and ranging an object, the method being of the type that, for example, calculates a distance to the object.

In so-called time-of-flight sensing systems and other systems, for example night vision systems, it is known to employ an illumination source to illuminate a surrounding environment within a field of view of the illumination source, sometimes known as a "scene". In this regard, so-called LIDAR (Light Detection And Ranging) systems are employed. One type of LIDAR illuminates the scene with pulses of light and typically comprises an illumination source, a detection device, for example an array of photodiodes, some optical elements and a processing unit. The illumination source illuminates the scene with pulses of light. Light pulses reflected from an object in the scene are received by the detection device and converted to an electrical signal, which are then processed by the processing unit by way of a time-of-flight calculation in order to determine the distance of the object from the detection device.

However, many implementations of the pulsed-light detection and ranging systems require the received pulses to be complete, and input signals that are saturated render identification of the start of pulses inaccurate, thereby making many known detection methods impractical for optical ranging applications. In this regard, such methods sometimes rely on receiving an unsaturated pulse, because for example peak detection is employed or some other technique that requires the pulse waveform substantially intact in order to calculate the time of flight of the emitted light pulse.

One known solution employs an algorithm for well-received pulses and different algorithms for cases of pulses suffering from even minimal saturation. However, transitions between algorithms lead to systematic errors in distance computations.

Another solution employing, for example, peak detection requires the system to be calibrated to output power level, amplitude of incoming signal and/or level of saturation.

In some fields where pulse detection is required, it is unsuitable to employ comparators, which rely upon a thresholding principle, to find the maximum of a pulse, because rise times of different peaks being analysed vary, and so identification of the peaks based upon an amplitude threshold leads to different results depending upon the rise time of a given pulse. This can lead, for example, to the peak time of one pulse having a first rise time being correctly identified, but the peak time of another pulse having a steeper rise time and greater amplitude peak being incorrectly identified. This misidentification of the peak time is known as "time walk". Typically, in such circumstances, it is known to employ a so-called "constant fraction discriminator" to identify peaks by determining when a fraction of the maximum of the peak signal has been reached, for example 75% of the signal peak value. This avoids the problem of time walk, but introduces processing delays and increases system complexity.

According to a first aspect of the present invention, there is provided a pulsed-light detection and ranging apparatus comprising: an optical detector arranged to generate, when in use, time-series data in response to an optical pulse incident thereupon; a processing resource arranged to support a pulse analyser, the pulse analyser being arranged to identify an inflection point of a pulse described by the time-series data; wherein the pulse analyser is further arranged to calculate a distance based upon the determined inflection point relative to a time axis associated with the time-series data.

The pulse analyser may be arranged to calculate a tangent line in respect of the pulse at the inflection point and to determine an intersection of the tangent line with the time axis.

The pulse analyser may be further arranged to use the determined intersection of the tangent line with the time axis to calculate the distance.

The pulse analyser may comprise an inflection point calculator arranged to analyse the time-series data and identify the inflection point in respect of the pulse.

The inflection point calculator may be arranged to identify the inflection point by determining a first derivative of the time-series data or a second derivative of the time-series data.

The pulse may comprise a rising edge and the inflection point may be on at least a portion of the rising edge of the pulse.

The pulse analyser may comprise a tangent calculator arranged to calculate the tangent line to the pulse at the inflection point identified.

The tangent calculator may calculate more than one tangent line about the inflection point and may calculate the tangent line by averaging the more than one tangent line calculated.

The pulse analyser may comprise an intersection calculator arranged to calculate an x-intercept of the tangent line calculated; the x-intercept may correspond to intersection with the time axis.

The pulse analyser may comprise a distance calculator arranged to calculate a distance using the x-intercept calculated.

The optical pulse may be a reflected optical pulse.

According to a second aspect of the present invention, there is provided a pulsed-light detection and ranging system comprising: the pulsed-light detecting and ranging apparatus as set forth above in relation to the first aspect of the invention; and a pulsed light source.

The system may further comprise a synchronisation unit arranged to communicate a time of emission of a light pulse by the pulsed light source.

According to a third aspect of the present invention, there is provided a method of detection and ranging of an object in a pulsed light detection and ranging system, the method comprising: receiving time-series data from an optical detector; calculating an inflection point from the time-series data; and calculating a distance based upon the determined inflection point relative to a time axis associated with the time-series data.

The method may further comprise: calculating a tangent line at the calculated inflection point; and calculating an intersection point where the calculated tangent line intersects the time axis.

The distance from the detector to the object may be calculated using the calculated intersection point.

The method may further comprise calculating the inflection point by calculating a first derivative of the time-series data or a second derivative of the time-series data.

The method may further comprise calculating the tangent line by calculating more than one tangent line about the inflection point and calculating an average of the more than one tangent line calculated.

The time-series data may correspond to a pulse; the pulse may comprise a rising edge; and the inflection point may be calculated in respect of at least a portion of the rising edge of the pulse.

The method may further comprise receiving a synchronisation signal indicative of a time of emission of an optical pulse.

According to a fourth aspect of the present invention, there is provided a computer program code element comprising computer program code means to make a computer execute the method as set forth above in relation to the third aspect of the present invention.

The computer program code element may be embodied on a computer readable medium.

It is thus possible to provide an apparatus and method that is immune to signal saturation and therefore can range an object without the need to receive a properly formed pulse from a detector array, for example for reasons of signal saturation. In this respect, the apparatus and method support accurate ranging of objects using only a part of the leading edge of a pulse. The apparatus and method provide a necessary degree of precision when calculating distance to the object, as well as increasing the dynamic range of the signals that the optical detector device used can detect. The method and apparatus can determine range from pulses irrespective of the amplitude of the pulses, thereby avoiding the need to calibrate per signal strength and other factors. The apparatus and method also provide the measured distance using relatively simple mathematical operations, thereby reducing the processing overhead required as well as facilitating improved speed of detection.

At least one embodiment of the invention will now be described, by way of example only, with reference to the accompanying drawings, in which.

Throughout the following description, identical reference numerals will be used to identify like parts.

Figure 1:
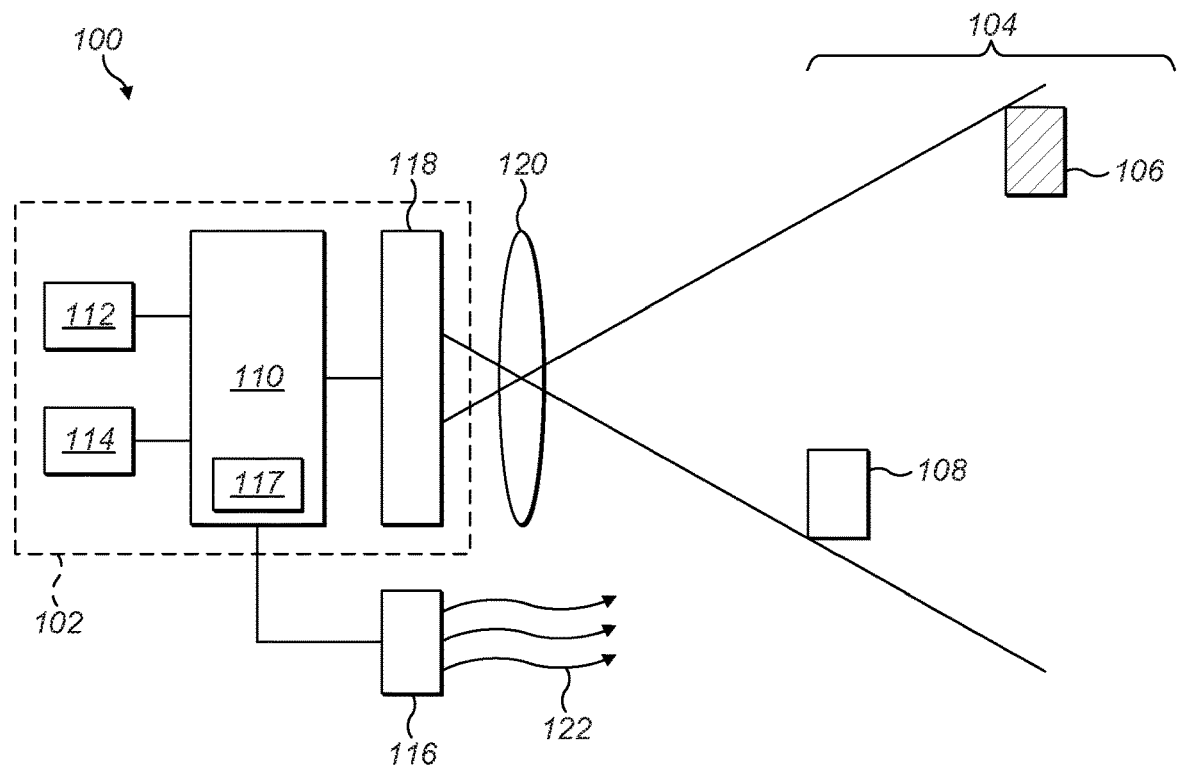
FIG. 1 is a schematic diagram of a pulsed light detection and ranging apparatus constituting an embodiment of the invention.

Referring to FIG. 1, a pulsed-light detection and ranging apparatus 100 is, for example, disposed within an environment to monitor a so-called scene 104. A typical application for the apparatus 100 is in a LIDAR system. The scene 104 comprises a low reflective object 106 and a highly reflective object 108.

The apparatus 100 comprises a detection and ranging circuit 102 comprising a processing resource, for example a microprocessor 110 operably couple to a non-volatile memory, for example a Read Only Memory (ROM) 112 and a volatile memory, for example a Random Access Memory (RAM) 114. An illumination source, for example a pulsed optical or light source 116, such as a pulsed-laser, is operably coupled to the microprocessor 110, the microprocessor 110 supporting a synchronisation unit 117. The microprocessor 110 is also operably coupled to an optical detection device, for example an array of photodiodes 118, typically via signal processing and conditioning circuits (described later herein). An optical system comprising, for example a lens 120, such as a focusing lens, can also be provided adjacent the array of photodiodes 118 of the apparatus 100.

Figure 2:
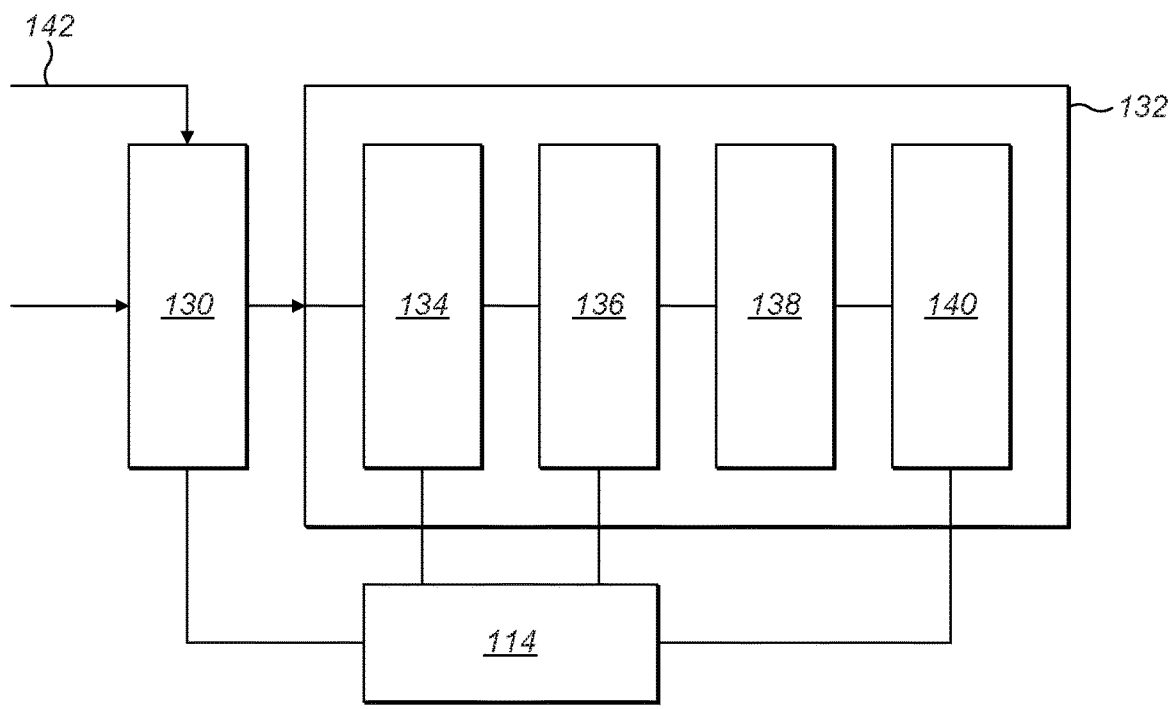
FIG. 2 is a schematic diagram of a pulse analyser supported by the apparatus of FIG. 1.

Turning to FIG. 2, the processing resource, for example the microprocessor 110 is operably coupled to the array of photodiodes 118 via a signal preparation and conditioning circuit 130. The signal preparation and conditioning circuit 130 typically comprises amplification circuitry, analogue-to-digital conversion circuitry, low pass filtering circuitry and pulse detection circuitry, in order to yield an output signal that can be processed by the microprocessor 110. The signal preparation and conditioning circuit 130 also comprises a sync input 142 operably coupled to the synchronisation unit 117. The microprocessor 110 supports a number of functional units. In this regard, the microprocessor 110 supports a pulse analyser unit 132 comprising an inflection point calculation unit 134 operably coupled to the signal preparation and conditioning circuit 130, the inflection point calculation unit 134 also being operably coupled to the RAM 114 and a tangent calculation unit 136. The tangent calculation unit 136 is also coupled to the RAM 114 and an intersection calculation unit 138. A distance calculation unit 140 is operably coupled to the intersection calculation unit 138 and is also operably coupled to the RAM 114.

In operation (FIG. 3), the pulsed optical source 116 emits (Step 202) pulses of light 122, for example under the instruction of (Step 200), i.e. triggered by, the synchronisation unit 117, which illuminate the scene 104 and are incident upon the low reflective object 106 and the highly reflective object 108. The trigger signals generated by the synchronisation unit 117 are also communicated to the signal preparation and conditioning circuit 130 via the sync input 142. Light incident upon the objects 106, 108 is reflected thereby to different degrees depending upon their respective reflectivities. The reflected light is received by the array of photodiodes 118 and converted (Step 204) to the electrical domain in the form of a time varying analogue output signal corresponding to the intensity of light received by the array of photodiodes over a period of time. In this respect, the receipt of the sync signal by the signal preparation and conditioning circuit 130 is used by the signal preparation and conditioning circuit 130 as an indication of when, in time, to start "recording" the time varying analogue output signal received from the array of photodiodes 118. The analogue signal generated is processed by the signal preparation and conditioning circuit 130 in order to yield (Step 204) time-series data, which is provided to the pulse analyser unit 132, in particular the inflection point calculation unit 134. Such processing can include filtering, for example low-pass filtering or Gaussian filtering.

Figure 4:
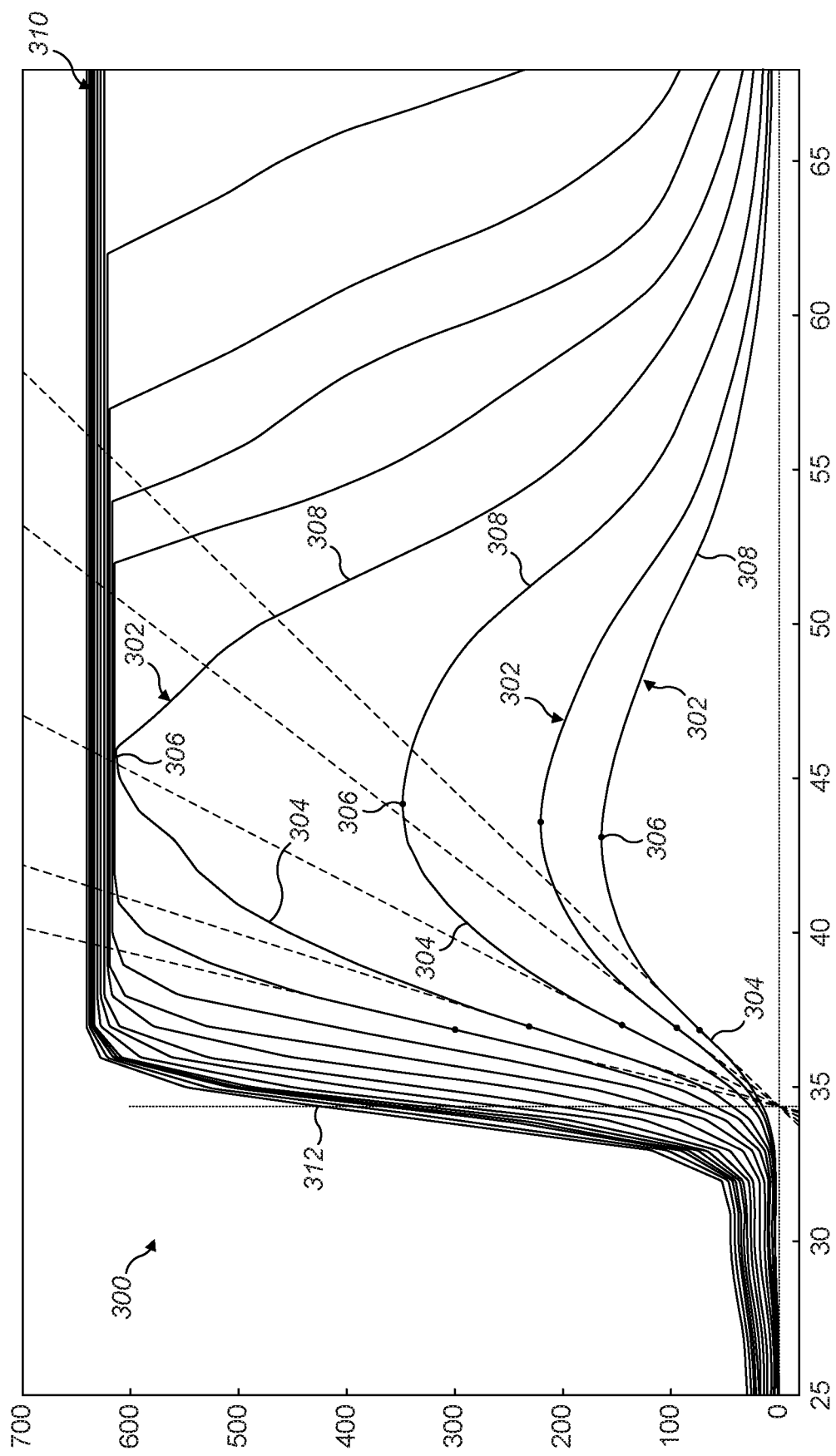
FIG. 4 is a schematic diagram of a plurality of pulses generated by the apparatus of FIG. 1.

Referring briefly to FIG. 4, in a scene comprising multiple objects comprising, for example the low reflective object 106 and the highly reflective object 108, multiple reflections of a light pulse 122 emitted by the pulsed optical source 116 are received by the array of photodiodes 118, resulting in a plurality of time-series pulses 300. Some pulses 302, due to the relatively low reflectivity of the objects reflecting the incident light pulse, are well-formed and have leading edges 304, peaks 306, and trailing edges 308. However, other pulses 310, due to the high reflectivity of the objects reflecting the incident light pulse, are saturated and only have leading edges 312, thereby constituting saturated receive signals. In the embodiments set forth herein, a receive time can be attributed to the pulses irrespective of whether they are saturated or not.

Given that well-formed pulses are typically not problematic to process in order to attribute a time of arrival to the pulse, the processing of a saturated received signal will now be described to exemplify the operation of the embodiments set forth herein.

For the sake of simplicity and clarity of explanation of processing of a saturated received pulse for the purpose of attributing a time of arrival of the saturated received pulse, processing of a single saturated received pulse by the pulse analyser unit 132 will now be described.

Figure 3:
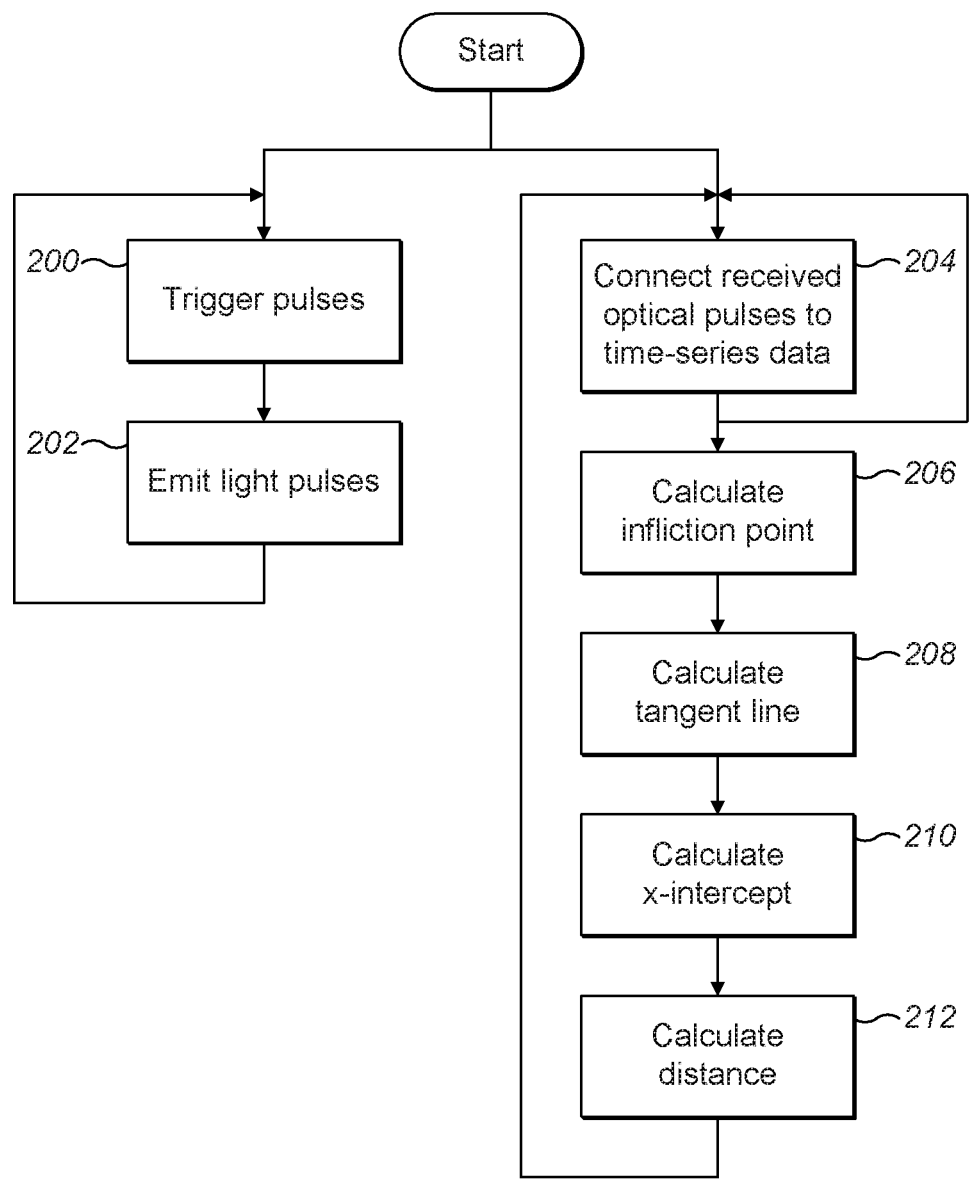
FIG. 3 is a flow diagram of a method of detecting and ranging an object constituting another embodiment of the invention.
Figure 5:
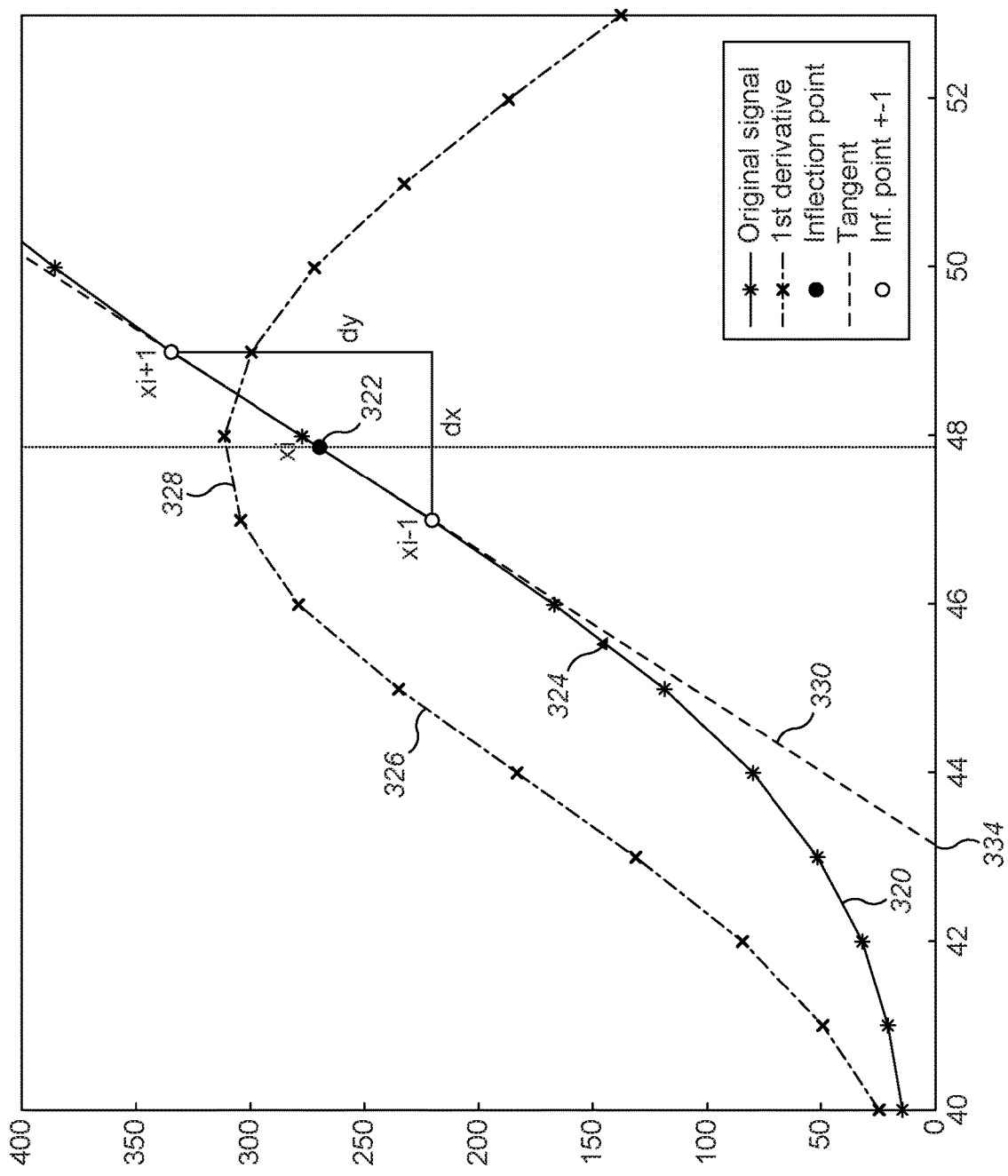
FIG. 5 is a schematic diagram of a pulse being analysed in accordance with the method of FIG. 3.

Turning to FIGS. 3 and 5, the saturated received pulse 320 is represented or described by time-series data, which comprises a plurality of intensity and time value pairs, in this example. The time-series data is generated by the signal preparation and conditioning circuit 130 and communicated to the inflection point calculation unit 134. The inflection point calculation unit 134 determines (Step 206) an inflection point 322 on a rising edge 324 of the saturated received pulse 320, for example a portion of the rising edge 324. In this example, the inflection point 322 is identified by calculating a first derivative 326 of the curve of the rising edge 324 or part thereof of the saturated received pulse 320 and identifying a peak 328 of the first derivative 326, for example using a numerical method or a curve fitting technique to identify a suitable curve for which the first derivative 326 thereof can be calculated. Of course, other techniques can be employed, for example by calculation of a second derivative of the curve of the rising edge 324 or part thereof of the saturated received pulse 320 and identifying a zero-crossing of the second derivative.

The time-series data is stored in the RAM 114 by the inflection point calculation unit 134, although any other suitable functional unit of the apparatus 100 can store the time-series data in the RAM 114 or the time-series data can be communicated to the tangent calculation unit 136. The inflection point calculation unit 134 communicates the location of the inflection point 322 on the rising edge 324 of the saturated received pulse 320 to the tangent calculation unit 136 for use in calculating a tangent or tangent line 330 of the rising edge 324 of the saturated received pulse 320 at the inflection point 322.

In this example, the tangent calculation unit 136 calculates (Step 208) the tangent 330 by calculating a plurality of tangent lines over a number of points about the inflection point 322. In this regard, the tangent line 330 is calculated by calculating a first or second order interpolation over data in the region around the inflection point 322. For example, if the inflection point 322 is located at time $x_i$ on the time axis, interpolation is performed in respect of points $x_{i-1}$, $x_i$, $x_{i+1}$, i.e. more than one tangent line is calculated about the inflection point. The tangent line 330, which is determined by the expression dy/dx, is determined in respect of each of $x_{i-1}$, $x_i$, $x_{i+i}$ and then the tangent values calculated are averaged. Of course, the skilled person will appreciate that any other suitable technique to calculate the tangent line 330 can be employed.

Thereafter, the tangent line 330 and the location of the inflection point 322 are, in this example, communicated by the tangent calculation unit 136 to the intersection calculation unit 138, which uses an appropriate algorithm to determine (Step 210) where the tangent line 330 calculated intersects with the time axis, for example by solving a linear equation describing the tangent line 330 to find the time at which the abscissa value is zero, such as y=0. The time, i.e. the x-intercept 334, at which the tangent line 330 intersects with the time axis is then communicated to the distance calculation unit 140, which determines the position of the x-intercept relative to the beginning of the time-series data, which point is effectively a start time, i.e. the time at which the optical pulse is deemed to have been emitted. With knowledge of the start time when the pulse of light 122 was emitted and the time of arrival of the reflected pulse as computed using the time-series data, the distance calculation unit 140 can calculate a round-trip travel time, which is halved in order to determine a one-way travel time. Using the speed of light, the one-way travel time calculated can be used to calculate (Step 212) the distance, i.e. range, of the object responsible for reflecting the pulse of light 122.

It should be appreciated that the x-intercept 334, where tangent line 330 at inflection point 332 intersects the baseline, can be considered as a notional "starting" point of the pulse and so can be used to define the distance to an object. This notional starting point can be assigned on account of the Gaussian nature of the pulses to be analysed. In this regard, in a fixed system, a point of intersection of a tangent line at an inflection point with a baseline of the pulse is not dependent on the amplitude of the pulse, namely the signal strength of the emitted signal or the signal strength of the received signal. The inflection point serves as a basis for determining, consistently, a point of reference for judging a time of arrival in respect of the pulse. Of course, the skilled person will appreciate that a distance offset can be determined through a calibration process in order to ensure an accurate correspondence between an actual distance and a distance calculated from analysis of the time of arrival of the reflected pulse having a notional starting point determined using a consistent manner of determination. The offset calculated can then be applied to the calculated distance, for example by the distance calculation unit 140. In another embodiment, the offset can be applied in relation to adjusting the time at which the pulse is determined to have been received or an adjustment can be made to the time at which the signal preparation and conditioning circuit 130 starts recording the analogue output signal received, i.e. an adjustment is made to when the pulse is deemed to have been emitted.

The skilled person should appreciate that the above-described implementations are merely examples of the various implementations that are conceivable within the scope of the appended claims. Indeed, it should be appreciated that the sync signal need not be provided by a synchronisation unit specifically supported by the microprocessor 110 and other techniques to ensure that the distance calculation unit 140 knows the time of emission of a given pulse of light 122 can be employed.

In other examples, the determination of x-intercepts is not necessary. For example, the location of the inflection point, in time, can be employed to determine the start of the pulse. Also, in other examples, other techniques can be employed as an alternative to determining the inflection point in order to, more generally, determine analytically, by any suitable geometric analysis technique for example calculus, a point on at least a portion of a rising edge of the pulse described by the time-series data, the analytical determination being a consistent identification of the point on the rising edge of the pulse with respect to the overall portion of the rising edge being analysed. In this regard, pulse analyser can use the determined point of the portion of the rising edge of the pulse relative to a time axis associated with the time-series data to calculate a distance.

Although the above examples are directed to detection of an inflection point of a signal corresponding to a reflected pulse of electromagnetic radiation, the above described techniques can be employed in relation to other fields of endeavour. Therefore, in another embodiment in relation to ultrasound scanning, an electrical probe signal emitted by a transducer as a probe acoustic signal can be provided to a receive signal processing chain in synchronism with application to the transducer of the electrical probe signal in order to provide a reference point in time for measuring a time of flight of the emitted probe signal. The transducer subsequently translates a reflected acoustic signal, for example an acoustic echo signal, into the electrical domain, thereby generating an electrical equivalent of the acoustic echo signal, hereinafter referred to as an "electrical echo signal". The electrical probe signal differs in form from the electrical echo signal, because whereas the electrical probe signal is applied directly to an input of the receive signal processing chain, the electrical echo signal is the result of the electrical probe signal being translated to the acoustic domain by the transducer and then back to the electrical domain upon receipt of the acoustic echo signal. The waveform of the electrical echo signal is therefore distorted as compared with the original electrical probe signal, for example the gradients of the respective rise and fall times differ. As such, in order to use identified inflection points to measure time of flight, as described above, it is necessary to apply a correction to the electrical echo signal. However, since the distortion caused by transducer is substantially consistent, the receive signal processing chain can be configured to determine a first inflection point of the electrical probe signal and a second inflection point of the electrical echo signal, and to correct the calculated location in time of the inflection point of the electrical echo signal, using a time offset value. As explained above, the time offset value is a consistent and so does not vary.

In another embodiment, the above described techniques can be employed with respect to peak identification in other fields of endeavour, for example to identify peaks in high accuracy sensors, for example, particle sensors, medical sensors, such as those found in PET scanners, and scintillation counters. Such techniques can therefore be employed in so-called single- or multi-channel analyzers.

Indeed, it is envisaged that an edge detection and ranging apparatus can, for generally, comprise: a transducer configured to generate, when in use, time-series data in response to a pulse incident thereupon; a processing resource configured to support a pulse analyser, the pulse analyser being configured to identify an inflection point of a pulse described by the time-series data; wherein the pulse analyser is further configured to calculate a distance based upon the determined inflection point relative to a time axis associated with the time-series data It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared.

The series of computer instructions can constitute all or part of the functionality described above, and can also be stored in any memory device, volatile or non-volatile, such as semiconductor, magnetic, optical or other memory device.

What is claimed is:

1. A pulsed-light detection and ranging apparatus comprising:
   an optical detector configured to generate, when in use, time-series data in response to an optical pulse incident thereupon; and
   a processing resource configured to support a pulse analyser, the pulse analyser being configured to identify an inflection point of a pulse described by the time-series data, wherein
   the pulse analyser is further configured to calculate a distance based upon the determined inflection point relative to a time axis associated with the time-series data, the pulse analyser is configured to calculate a tangent line in respect of the pulse at the inflection point and to determine an intersection of the tangent line with the time axis, thereby providing a point of reference to determine a time of arrival of the pulse, and
   the pulse analyser is further configured to use the determined intersection of the tangent line with the time axis to calculate the distance.

2. The apparatus according to claim 1, wherein the pulse analyser comprises:
   an inflection point calculator configured to analyse the time-series data and identify the inflection point in respect of the pulse.

3. The apparatus according to claim 2, wherein the inflection point calculator is configured to identify the inflection point by determining a first derivative of the time-series data or a second derivative of the time-series data.

4. The apparatus according to claim 1, wherein the pulse comprises a rising edge and the inflection point is on at least a portion of the rising edge of the pulse.

5. The apparatus according to claim 1, wherein the pulse analyser comprises:
   a tangent calculator configured to calculate the tangent line to the pulse at the inflection point identified.

6. The apparatus according to claim 5, wherein the tangent calculator calculates more than one tangent line about the inflection point and calculates the tangent line by averaging the more than one tangent line calculated.

7. The apparatus according to claim 1, wherein the pulse analyser comprises:
   an intersection calculator configured to calculate an x-intercept of the tangent line calculated, the x-intercept corresponding to intersection with the time axis.

8. The apparatus according to claim 7, wherein the pulse analyser comprises:
   a distance calculator configured to calculate a distance using the x-intercept calculated.

9. The apparatus according to claim 1, wherein the optical pulse is a reflected optical pulse.

10. A pulsed-light detection and ranging system comprising:
    the pulsed-light detecting and ranging apparatus according to claim 1; and
    a pulsed light source.

11. A method of detection and ranging of an object in a pulsed light detection and ranging system, the method comprising:
    receiving time-series data from an optical detector;

calculating an inflection point of a pulse described by the time-series data;

calculating a distance based upon the determined inflection point relative to a time axis associated with the time-series data;

calculating a tangent line in respect of the pulse at the inflection point;

calculating an intersection where the tangent line intersects the time axis, thereby providing a point of reference to determine a time of arrival of the pulse; and the distance from the detector to the object is calculated using calculated intersection.

12. The method according to claim 11, further comprising:

calculating the inflection point by calculating a first derivative of the time-series data or a second derivative of the time-series data.

13. The method according to claim 11, further comprising:

calculating a tangent line by calculating more than one tangent line about the inflection point and calculating an average of the more than one tangent line calculated.

14. The method according to claim 11, wherein the time-series data corresponds to a pulse, the pulse comprising a rising edge; and the inflection point is calculated in respect of at least a portion of the rising edge of the pulse.

15. The method according to claim 11, further comprising:

receiving a synchronisation signal indicative of a time of emission of an optical pulse.

* * * * *